(12) United States Patent
Park (10) Patent No.: US 9,573,614 B2
(45) Date of Patent: Feb. 21, 2017

(54) ELECTRIC STEERING LOCK DEVICE OF VEHICLE AND ASSEMBLY METHOD THEREOF

(75) Inventor: Ki Woong Park, Ansan-si (KR)

(73) Assignee: DAE DONG CO., LTD., Ansan-si (KR)

( * ) Notice: Subject to any disclaimer, the term of this patent is extended or adjusted under 35 U.S.C. 154(b) by 365 days.

(21) Appl. No.: 14/350,506

(22) PCT Filed: Jul. 31, 2012

(86) PCT No.: PCT/KR2012/006088
§ 371 (c)(1),
(2), (4) Date: Jun. 6, 2014

(87) PCT Pub. No.: WO2013/055022
PCT Pub. Date: Apr. 18, 2013

(65) Prior Publication Data
US 2014/0318195 A1    Oct. 30, 2014

(30) Foreign Application Priority Data

Oct. 10, 2011   (KR) .......................... 10-2011-0103192

(51) Int. Cl.
*B60R 25/02*     (2013.01)
*B62D 1/184*     (2006.01)
*B60R 25/0215*   (2013.01)

(52) U.S. Cl.
CPC ......... *B62D 1/184* (2013.01); *B60R 25/02153* (2013.01); *Y10T 29/49009* (2015.01); *Y10T 70/5659* (2015.04); *Y10T 70/5664* (2015.04); *Y10T 70/5757* (2015.04)

(58) Field of Classification Search
CPC ............... B62D 1/184; B60R 25/02153; B60R 25/02156; B60R 25/0211; Y10T 70/5757; Y10T 70/5659; Y10T 70/5664; Y10T 29/49009
USPC .............. 29/596; 70/182–187, 190, 191, 252
See application file for complete search history.

(56) References Cited

U.S. PATENT DOCUMENTS

| | | | | |
|---|---|---|---|---|
| 5,896,765 A * | 4/1999 | Peyre | ................ | B60R 25/02153 292/144 |
| 6,233,986 B1 * | 5/2001 | Suzuki | ................ | B60R 25/0211 464/57 |
| 6,354,118 B1 * | 3/2002 | Frick | ................ | B60R 25/02153 70/186 |
| 6,675,673 B2 * | 1/2004 | Starken | ............ | B60R 25/02153 70/186 |
| 7,604,254 B2 * | 10/2009 | Pieronczyk | ....... | B60R 25/02153 180/277 |

(Continued)

FOREIGN PATENT DOCUMENTS

EP    2055530 A2    5/2009
JP    04-257782 A   9/1992
(Continued)

*Primary Examiner* — Lloyd Gall
(74) *Attorney, Agent, or Firm* — Birch, Stewart, Kolasch & Birch, LLP (57) ABSTRACT

The present invention relates to an electric steering lock device of a vehicle and an assembly method thereof, more specifically, the invention can also be provided on a column housing of a different vehicle having a manual steering lock device by reducing the height of the product, and is capable of reducing the number of assembly process during assembling.

5 Claims, 10 Drawing Sheets

(56) References Cited

U.S. PATENT DOCUMENTS

| | | | |
|---|---|---|---|
| 9,027,432 B2* | 5/2015 | Takano | B60R 25/0215 70/182 |
| 2001/0025516 A1* | 10/2001 | Starken | B60R 25/02153 70/186 |
| 2002/0069683 A1* | 6/2002 | Bartels | B60R 25/02153 70/186 |
| 2006/0169011 A1* | 8/2006 | Limburg | B60R 25/02153 70/186 |
| 2008/0028806 A1* | 2/2008 | Fort | B60R 25/02153 70/186 |
| 2009/0193861 A1* | 8/2009 | Kudou | B60R 25/02153 70/187 |
| 2010/0206020 A1 | 8/2010 | Chen et al. | |
| 2010/0212378 A1 | 8/2010 | Chen et al. | |

FOREIGN PATENT DOCUMENTS

| | | |
|---|---|---|
| JP | 2007-131156 A | 5/2007 |
| JP | 2007-230350 A | 9/2007 |
| JP | 2009-234582 A | 10/2009 |
| KR | 10-0833383 B1 | 5/2008 |
| KR | 10-2009-0100729 A | 9/2009 |

\* cited by examiner

FIG. 1a

Prior Art

ELECTRIC STEERING LOCK DEVICE OF VEHICLE AND ASSEMBLY METHOD THEREOF

TECHNICAL FIELD

The present invention relates to an electric steering lock device in a vehicle, and more particularly, to an electric steering lock device in a vehicle in which a height thereof is reduced, and two stage reduction gear is used to increase a torque from a drive motor to increase an unlocking performance, and which can simplify assembly steps; and an assembly method thereof.

BACKGROUND ART

In general, the electric steering lock device is mounted to the vehicle for sensing stop of the vehicle when the drive stopped drive to lock a steering column of the vehicle for preventing stolen vehicle by preventing running of the vehicle by using the steering handle.

Figure 1A:
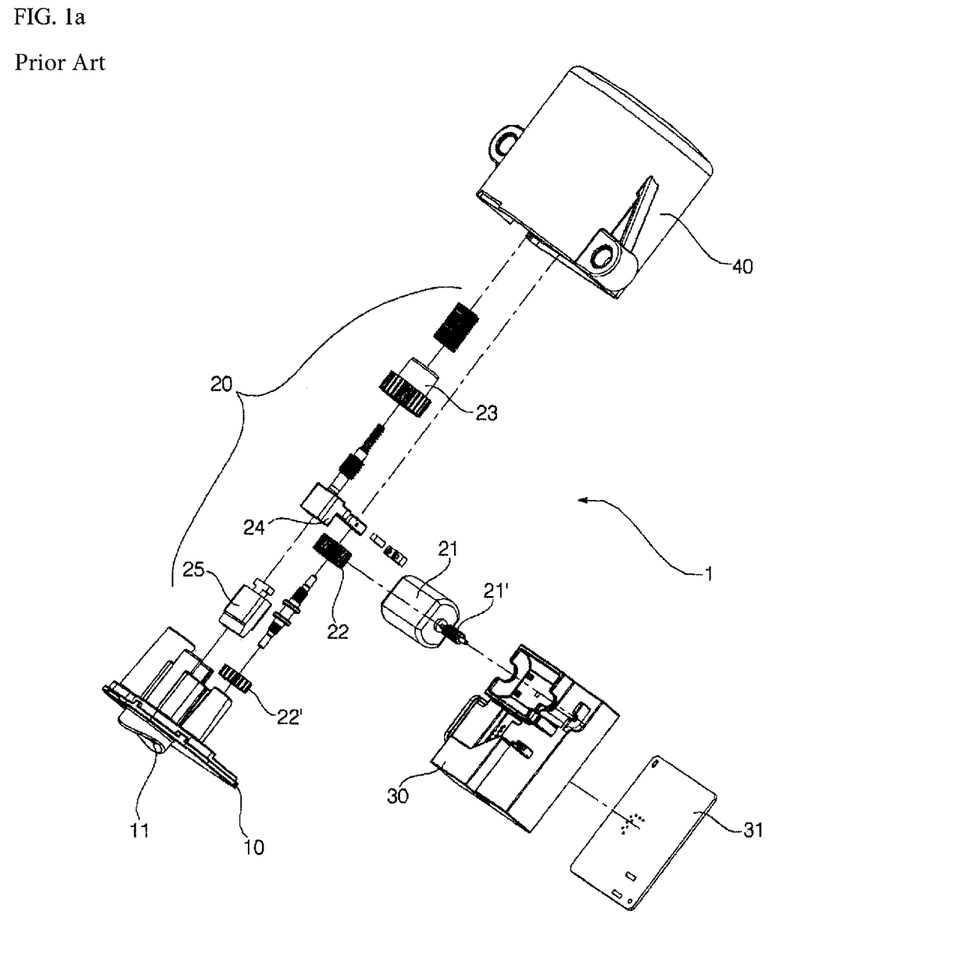
FIGS. 1a and 1b illustrate an exploded perspective view and an inside configuration of an example of a related art electric steering lock device 1 in a vehicle, respectively.
Figure 1B:
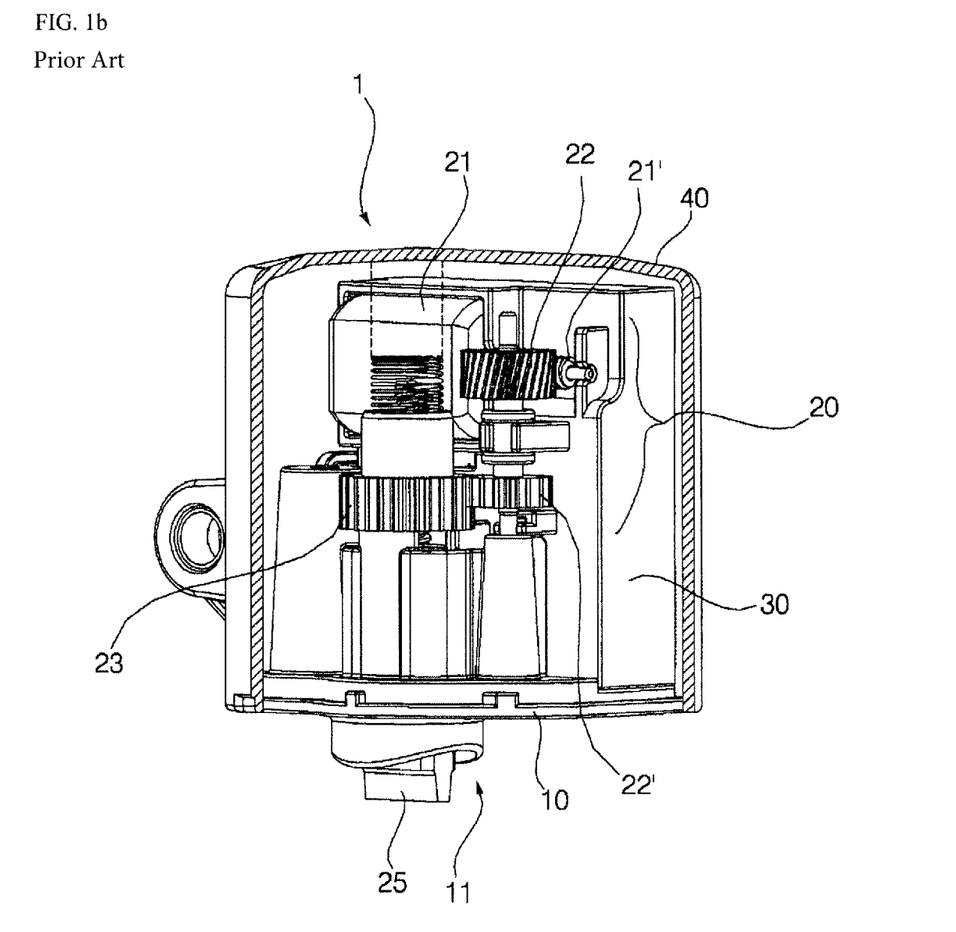

FIGS. 1a and 1b illustrate an exploded perspective view and an inside configuration of an example of a related art electric steering lock device 1 in a vehicle, respectively.

Referring to FIGS. 1a and 1b, the related art electric steering lock device 1 in a vehicle is provided with a lock body 10 having a plurality of mounting places (No reference numerals are given) for mounting predetermined components thereto in the steering lock device 1, a plurality of components 20 respectively mounted to the mounting places of the lock body 10, and a cover unit 40 coupled to a top side of the lock body 10 having the plurality of components 20 mounted thereon.

The plurality of components 20 may be mounted to the plurality of mounting places formed on the lock body 10, or in a separate mounting housing 30 coupled to an upper side of the plurality of mounting places. In more detail, the separate mounting housing 30 may have a drive motor 21 coupled to an upper side thereof, and a socket (Not shown) coupled to a lower side thereof for applying power thereto, and the plurality of mounting places may have a first worm wheel gear 22 and a second worm wheel gear 22' for having the power forwarded thereto from a worm gear 22 arranged at the fore end of the drive motor 21, a spur gear 23 and a lock stopper unit 24 mounted thereto together with a lock bar 25.

As known, the lock bar 25 serves to lock or unlock the steering column (Not shown) while moving up/down along a lock hole 11 formed to be in communication with an underside of the lock body 10.

In the meantime, the related art electric steering lock device 1 in a vehicle has a PCB assembly 31 provided to the mounting housing 30 for generating an electric signal if the starting of the vehicle is turned off or by operation of the user.

In this case, if the electric signal is generated, the drive motor 21 is come into operation by a non-illustrated control unit, the worm gear 22 is rotated to forward power through the first worm wheel gear 22, the second worm wheel gear 22', and the spur gear 23 for a lock stopper unit 24 to move up/down, finally.

However, since the related art electric steering lock device 1 in a vehicle is mounted and assembled such that the power is forwarded only toward a lower side of the separate mounting housing 30 having the drive motor 21 provided thereto through the first worm wheel gear 22, the second worm wheel gear 22', and the spur gear 23, the related art electric steering lock device 1 in a vehicle has a problem in that the up/down direction height becomes large. The problem results in a problem in that a total height of the electric steering lock device 1 in a vehicle increases to unable to mount the electric steering lock device to a column housing to which a manual steering lock device is mounted, requiring to manufacture the column housing for the electric steering lock device and the column housing for the manual steering lock device, separately.

In the meantime, as described before, since the related art electric steering lock device 1 in a vehicle is required to mount the plurality of components 20 to the plurality of mounting places provided on the upper side of the lock body 10 and the separate mounting housing 30 one by one before assembly, to delay a time period of the assembly process very much, productivity of the product is poor.

DISCLOSURE

Technical Problem

To solve the problems, an object of the present invention is to provide an electric steering lock device in a vehicle which can reduce assembly steps substantially and a number of components, and applicable both to a column housing for an electric steering lock device and a column housing for a manual steering lock device to enable to use the electric steering lock device in common; and an assembly method thereof.

Technical Solution

To achieve these objects and other advantages and in accordance with the purpose of the invention, as embodied and broadly described herein, an electric steering lock device in a vehicle includes a lock body having a lock hole formed opened downward, a cover unit coupled to an upper side of the lock body to form an inside space with the lock body, and a drive unit assembly arranged in the inside space to include a partition unit arranged to partition the inside space into an upper side and a lower side to have a plurality of mounting places formed on the upper side and the lower side, wherein the drive unit assembly generates power in the inside space which falls under the upper side of the partition unit and forwards the power to the inside space which falls under the lower side of the partition unit for moving the lock bar in a vertical direction through the lock hole.

In this case, the drive unit assembly may include a drive motor arranged on the upper side with a rotation shaft arranged horizontally, a worm gear coupled to a fore end of the drive motor to rotate centered on the rotation shaft of the drive motor, a worm wheel gear arranged on the upper side engaged with the worm gear to rotate centered on a vertical shaft, a spur gear arranged on the upper side engaged with the worm wheel gear to rotate centered on a vertical shaft and having a female thread portion opened downward formed therein, a lock stopper unit arranged on the lower side engaged with the female thread portion in the spur gear to move up/down, and a lock bar coupled to an underside of the lock stopper unit for locking or unlocking the steering column as the lock bar is exposed to an outside of the electric steering lock device in a vehicle as the lock bar moves up/down along the lock hole according to the up/down movement of the lock stopper unit.

And, the plurality of mounting places formed on the upper side may include a motor mounting place for mounting the drive motor thereto, a worm wheel gear mounting place for mounting the worm wheel gear thereto to engage with the worm gear to rotate centered on a vertical shaft, and a spur gear mounting place for mounting the spur gear thereto to rotate centered on a vertical shaft which is parallel to the vertical shaft of the worm wheel gear.

And, the plurality of mounting places may be formed to be recessed downward.

And, the worm wheel gear may include a first engage portion engaged with the worm gear, and a second engage portion engaged with the spur gear, wherein the second engage portion is positioned higher than the first engage portion to match with a top side height of the drive motor.

And, the lock stopper unit may include a male thread portion formed therein as one unit therewith at a top side thereof to match with the female thread portion in the spur gear.

In the meantime, a method for assembling an electric steering lock device in a vehicle in accordance with a preferred embodiment of the present invention includes a first assembly step for assembling a drive unit assembly by mounting a drive motor, a worm wheel gear, and a spur gear on an upper side and a lock stopper unit on a lower side for forwarding power generated in the upper side to the lower side with reference to a partition unit, a second assembly step for assembling the drive unit assembly assembled in the first assembly step to the lock body such that the lock bar moves back and forth through the lock hole formed downward, and a third assembly step for assembling the cover unit to a top side of the lock body such that the drive unit assembly assembled in the second assembly step is protected from an outside of the electric steering lock device.

In this case, the first assembly step may be a step for mounting a drive motor to a motor mounting place formed on the upper side of the partition unit, mounting a worm wheel gear to a worm wheel gear mounting place formed on the upper side of the partition unit, mounting a spur gear to a spur gear mounting place formed on the upper side of the partition, and mounting a lock stopper to a moving space formed on the lower side of the partition unit.

And, the drive motor is mounted to the horizontally such that the worm gear arranged at the fore end of the drive motor rotates centered on a horizontal axis, and the worm wheel gear and the spur gear are mounted such that rotation shafts of the worm wheel gear and the spur gear are perpendicular to a rotation shaft of the worm gear, and parallel to each other spaced predetermined distance from each other.

And, the third assembly step may be a step for fastening the lock body, the drive unit assembly, and the cover unit with fastening screws by fastening the lock body having fastening holes formed in at least four places falling under corners for fastening with the fastening screws, the drive unit assembly having pass through hole formed in at least four places falling under corners for fastening the fastening screws, and the screw fastening holes formed in the cover unit, with the fastening screws at a time.

Advantageous Effects

Since the electric steering lock device in a vehicle, and an assembly method thereof of the present invention has an advantage of enabling to form a vertical height of the product to a height matched to a manual steering lock device, permitting the column housing to be used in common, not only for the manual steering lock device, but also for the electric steering lock device.

And, the electric steering lock device in a vehicle, and an assembly method thereof of the present invention has an advantage of saving a number of components, substantially.

Along with this, the electric steering lock device in a vehicle, and an assembly method thereof of the present invention has an advantage of reducing assembly steps substantially by, assembling entire components which generate and forward power as one unit by providing the drive unit assembly, the cover unit is assembled to the lock body.

BEST MODE

Hereinafter, an electric steering lock device in a vehicle and an assembly method thereof in accordance with preferred embodiments of the present invention will be described in detail, with reference to the attached drawings.

Figure 2:
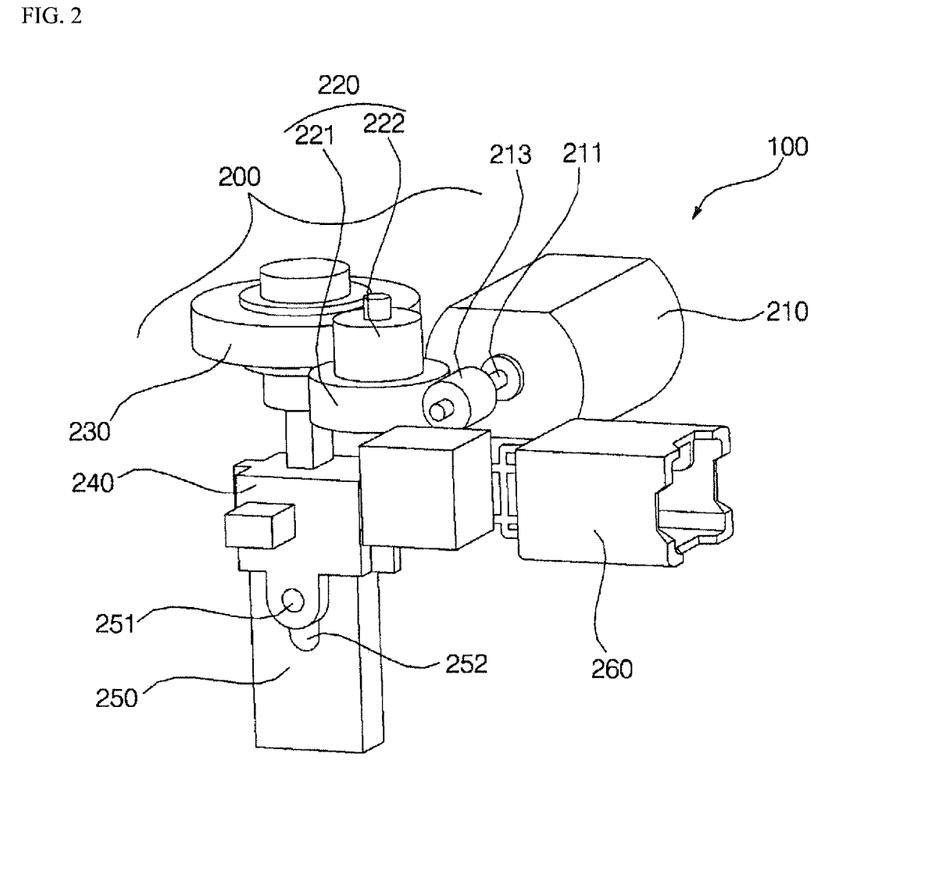
FIG. 2 illustrates a partial perspective view of a drive unit assembly of an electric steering lock device in a vehicle in accordance with the present invention.
Figure 6:
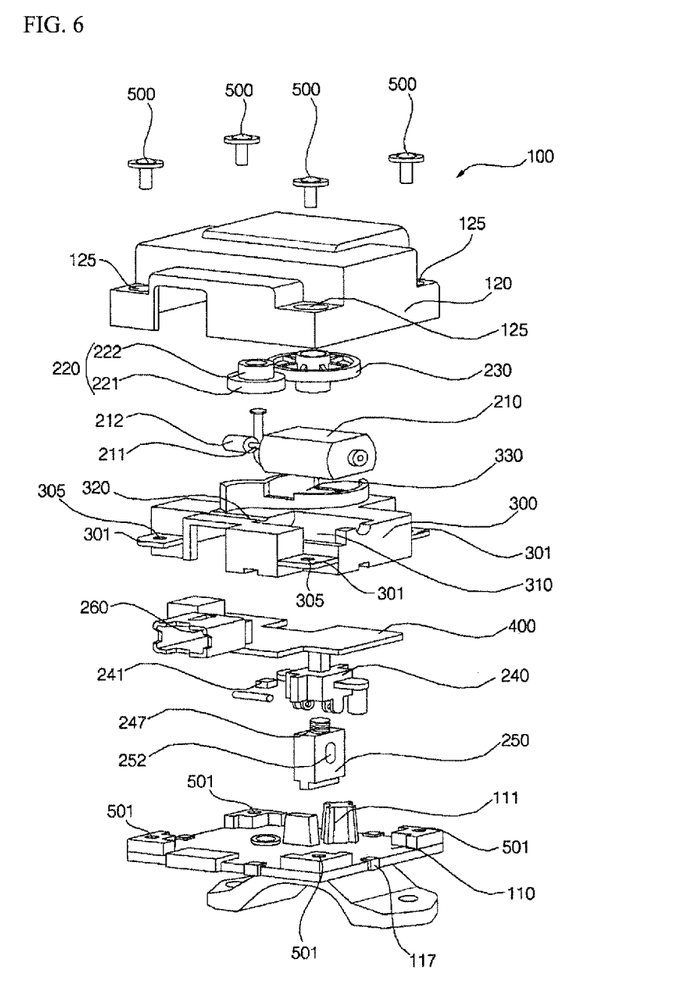
FIG. 6 illustrates an exploded perspective view of an electric steering lock device in a vehicle in accordance with the present invention.

FIG. 2 illustrates a partial perspective view of a drive unit assembly of an electric steering lock device in a vehicle in accordance with the present invention, and FIG. 6 illustrates an exploded perspective view of an electric steering lock device in a vehicle in accordance with the present invention.

Referring to FIGS. 2 and 6, the electric steering lock device 100 in a vehicle in accordance with a preferred embodiment of the present invention includes a lock body 110 having a lock hole 111 formed downward, and a cover unit 120 which forms an inside space with the lock body 110 coupled to an upper side of the lock body 110.

The lock body 110 has a semicircular mounting unit 600 provided to an underside thereof to surround a portion of a steering column (Not shown) and a lock hole 111 formed to pass through a mounting unit 600 side. And, the lock body 110 may have fastening holes 501 formed in four corners of an upper side thereof in a vertical direction for screw coupling to the cover unit 120.

Mounted in the inside space, there are the drive unit for providing power for a lock bar 250 to move back and forth through the lock hole 111, and various electric components for the drive unit.

In more detail, the electric steering lock device 100 in a vehicle in accordance with a preferred embodiment of the present invention includes a partition unit 300 arranged in the inside space to partition the inside space into an upper side and a lower side, wherein the drive unit and the various electric components for the drive unit (Hereinafter called as "a drive unit assembly 200" for the sake of convenience) are mounted to a plurality of mounting places formed on the upper side and the lower side of the partition unit 300.

There may be pass through holes 305 formed in at least four corners 301 of the partition unit 300 for pass through of fastening screws 500 which are to pass through the fastening holes 501 and screw fastening holes 125 in the cover unit 120 to be described later.

Referring to FIGS. 2 and 6, the drive unit assembly 200 serves to generate power at the inside space which falls under the upper side of the partition unit 300 and forwards the power to the inside space which falls under the lower side of the partition unit 300, for making the lock bar 250 to move up/down through the lock hole 111, at the end.

The drive unit assembly 200 includes a drive motor 210 arranged on the upper side with a rotation shaft 211 arranged horizontally, a worm gear 213 coupled to a fore end of the drive motor 210 to rotate when the rotation shaft 211 of the drive motor 210 rotates, a worm wheel gear 220 arranged on the upper side engaged with the worm gear 213 to rotate round a vertical shaft, a spur gear 230 arranged on the upper side engaged with the worm wheel gear 220 to rotate round a vertical shaft and having a female thread (No reference numeral is given) opened downward formed therein, a lock stopper unit 240 arranged on the lower side engaged with the female thread in the spur gear 230 to move up/down, and a lock bar 250 coupled to an underside of the lock stopper unit 240 for locking or unlocking the steering column as the lock bar 250 is exposed to an outside of the electric steering lock device in a vehicle as the lock bar 250 moves up/down along the lock hole 111 according to the up/down movement of the lock stopper unit 240.

In this case, the plurality of mounting places having the drive unit assembly 200 mounted thereto includes a motor mounting place 310 formed on the upper side for mounting the drive motor 210 thereto, a worm wheel gear mounting place 320 formed on the upper side for mounting the worm wheel gear 220 thereto to engage with the worm gear 213 to rotate round a vertical shaft, and a spur gear mounting place 330 for mounting the spur gear 230 thereto to rotate round a vertical shaft which is parallel to the vertical shaft of the worm wheel gear 220. On the lower side, there may be a moving space (Not shown) under the spur gear mounting place 330 for up/down movement of the lock stopper unit 240.

Figure 3A:
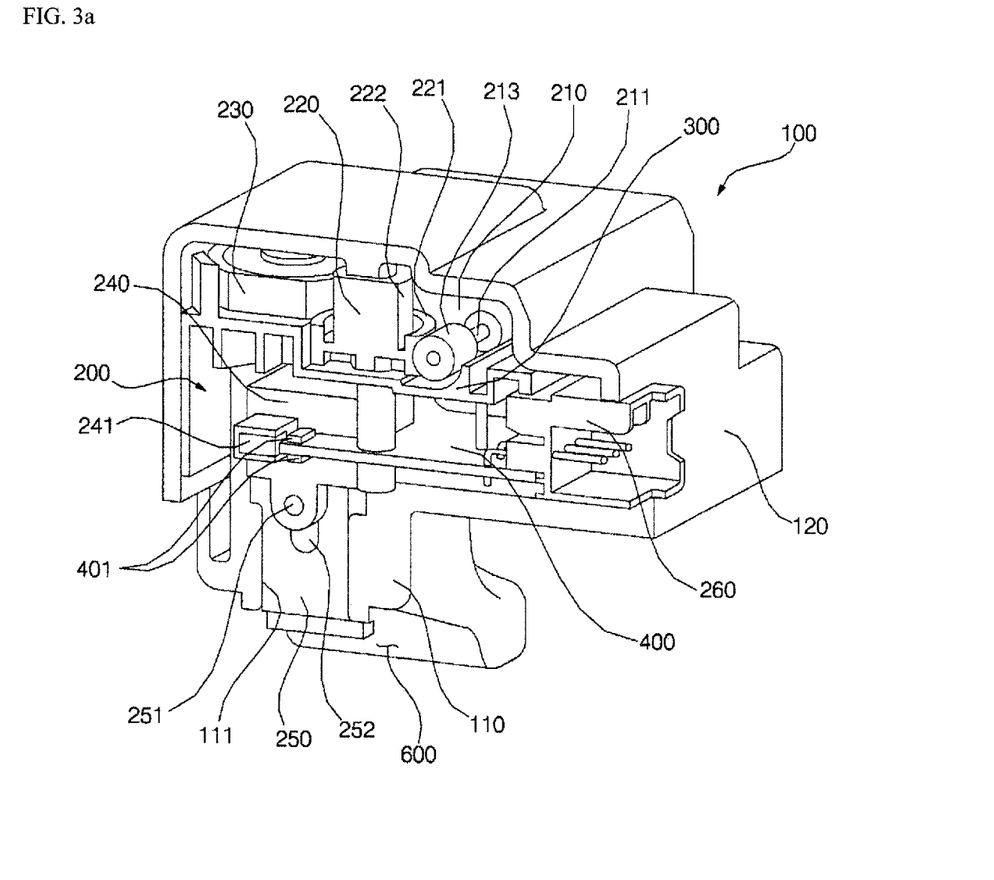
FIGS. 3a and 3b illustrate perspective views of a drive unit assembly mounted in an inside space of a lock body and a cover unit, showing cut opened views, respectively.
Figure 3B:
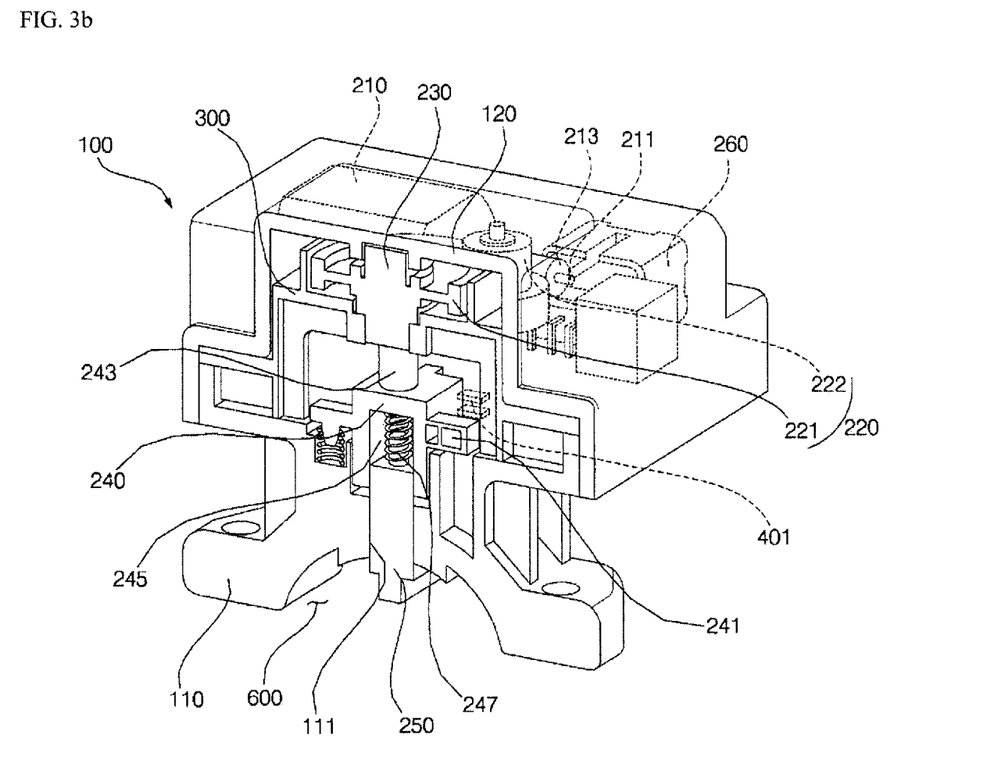

FIGS. 3a and 3b illustrate perspective views of a drive unit assembly mounted in an inside space of a lock body and a cover unit, showing cut opened views, respectively.

The inside space formed between the lock body 110 and the cover unit 120 is partitioned into the upper side and the lower side by the partition unit 300.

And, as described before, the inside space which falls under the upper side of the partition unit 300 has the motor mounting place 310 formed thereon, and the drive motor 210 is mounted to the motor mounting place 310, such that the rotation shaft 211 of the drive motor 210 is horizontal. In this case, it is preferable that the drive motor 210 has a top side mounted close to an inside of a top side of the cover unit 120.

Of the inside space which falls under the upper side of the partition wall 300, at a portion which falls under one side of the motor mounting place 310, the worm wheel gear mounting place 320 is formed, and the worm wheel gear 220 is mounted to the worm wheel gear mounting place 320 such that the worm wheel gear 220 is engaged with the worm gear 213 which is coupled to the fore end of the drive motor 210 to rotate together with the drive motor 210. In this case, it is preferable that the worm wheel gear 220 has a vertical shaft perpendicular to the rotation shaft 211 of the drive motor 210.

The worm wheel gear 220 has a first engage portion 221 engaged with the worm gear 213 directly, and a second engage portion 222 engaged with the spur gear 230.

It is preferable that the first engage portion 221 and the second engage portion are formed to rotate centered on the vertical shaft.

In the meantime, Of the inside space which falls under the upper portion of the partition wall 300, the spur gear mounting place 330 is formed at a portion which falls under one side of the worm wheel gear mounting place 320, and the spur gear 230 is mounted to the spur gear mounting place 330 so as to be engaged with the second engage portion 222 of the worm wheel gear 220. In this case, it is preferable that the spur gear 230 is mounted parallel to the rotation shaft of the worm wheel gear 220. In this case, it is preferable that the spur gear 230 is mounted parallel to the rotation shaft of the worm wheel gear 220.

In this case, the second engage portion 222 is positioned higher than the first engage portion 221 matched to a height of a top side of the drive motor 210. This is for embodying a vertical moving distance of the lock bar 250 which moves up/down for locking or unlocking the steering column with a product of a limited height by making a position of the second engage portion 222 which engages with the spur gear 230 to be higher than the first engage portion 221. That is, by reducing a vertical height of the drive unit assembly 200 which makes the lock bar 250 which moves vertically within the inside space to move vertically, the vertical height of the electric steering lock device 100 in accordance with the present invention can be reduced, actually.

The electric steering lock device 100 in accordance with the present invention can make a more compact inside design available by arranging the drive motor 210 at an upper most side of the inside space for positioning the second engage portion 222 by utilizing an empty space from the rotation shaft 211 of the drive motor 210 to an inside top portion of the inside space. Moreover, since the reduction of the height of the electric steering lock device 100 in accordance with the present invention matches to a height of a position at which a vehicle having the manual steering lock device is provided thereto, the reduction of the height of the electric steering lock device 100 in accordance with the present invention creates an advantage in which the column housing to which the steering lock device is mounted can be used in common regardless whether the steering lock device to be mounted is of manual type or electric type.

The spur gear 230 may have a lower end portion with a female thread portion formed to pass through an inside of the rotation shaft of the spur gear 230 in a vertical direction. A male thread portion 243 formed at a top side portion of the lock stopper unit 240 by processing as one unit with the lock stopper unit 240 is inserted in the female thread portion to engage with the spur gear 230 when the spur gear 230 turns such that the lock stopper unit 240 moves up or down depending on a rotation direction of the spur gear 230.

In the meantime, of the inside space which falls under the lower side of the partition unit 300, there is a moving space formed under the spur gear mounting place 330 for vertical movement of the lock stopper unit 240. The lock stopper unit 240 is mounted to the moving space to move in the vertical direction when the spur gear 230 rotates in a state the male thread portion 243 of the lock stopper unit 240 is inserted in the female thread portion of the spur gear 230.

The lock bar 250 is coupled to the lower end portion of the lock stopper unit 240 with a coupling pin 251. In this case, the lock bar 250 is coupled to the lock stopper unit 240, not firmly, but floatable by a predetermined distance in a vertical direction. That is, the lock bar 250 has a slot hole 252 extended in a vertical direction in the lock bar 250 for pass through of the coupling pin 251. If the coupling pin 251 is mounted passed through the slot hole 252, the lock bar 250 is floatable as much as a vertical length of the slot hole 252. And, there may be an elastic member 247 disposed in a space 245 between the lock bar 250 and the lock stopper unit 240 for applying elastic force to lock the lock bar 250 at a non-illustrated lock recess in the steering column when the driver rotates the steering wheel in a case the lock bar 250 fails to be inserted in the lock recess. Thus, the elastic member 247 disposed between the lock bar 250 and the lock stopper unit 240 supports the lock bar 250 downward elastically when the lock bar 250 floats as much as a vertical length of the slot hole 252 to make the lock bar 250 to lock at the lock recess, perfectly.

In the meantime, in the electric steering lock device 100 in a vehicle in accordance with a preferred embodiment of the present invention, the drive unit assembly 200 may further include a PCB (Printed Circuit Board) assembly 400 mounted horizontally in the inside space which falls under the lower side of the partition unit 300 so as not to interfere with the vertical movement of the lock stopper unit 240. The PCB assembly 400 has a socket unit 260 for supplying power.

On one side of the PCB assembly 400, a magnet sensing unit 401 may be provided for sensing magnetism of a magnet 241, and the lock stopper unit 240 may have the magnet 241 mounted thereto.

When the lock stopper unit 240 moves in the vertical direction by operation of the drive motor 210, the magnet sensing unit 401 senses a position of the magnet 241 for controlling the operation of the drive motor 210.

Referring to FIGS. 3a and 3b, before assembly of the lock stopper unit 240 having the drive motor 210, the worm wheel gear 220, the spur gear 230 and the lock bar 250 connected thereto to the plurality of mounting places, the lock stopper unit 240 may be coupled to the inside space which falls under the lower side of the drive unit assembly 200 having the foregoing configuration.

In the meantime, upon coupling the cover unit 120 on the lock body 110 having the drive unit assembly 200 assembled thereto, assembly of the electric steering lock device 100 in a vehicle in accordance with the present invention is completed.

A method for assembling an electric steering lock device 100 in a vehicle in accordance with a preferred embodiment of the present invention having the foregoing configuration will be described with reference to the attached drawings.

Figure 4A:
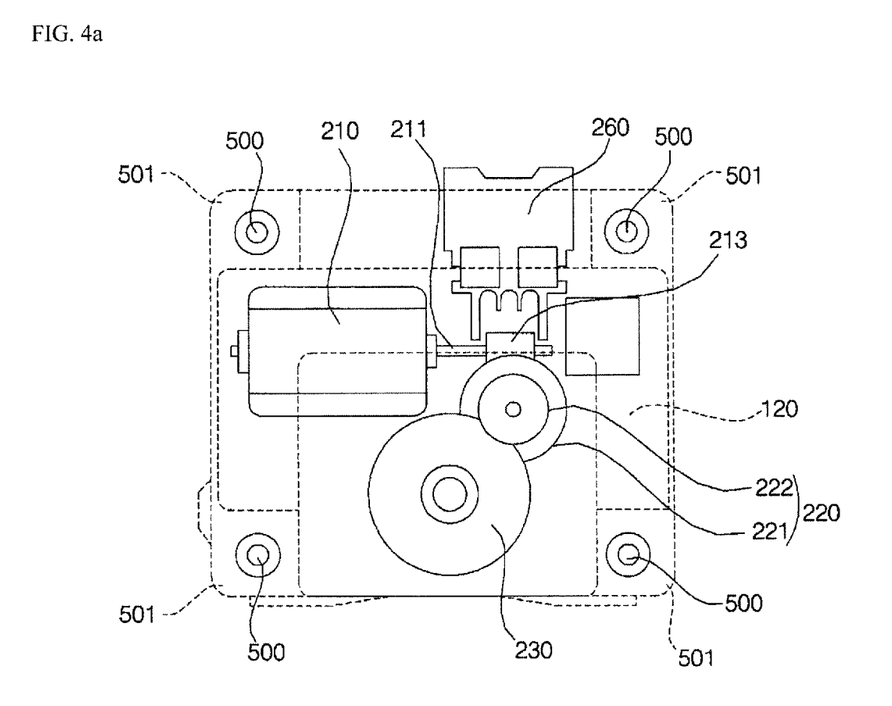
FIGS. 4a and 4b illustrate a plan view and a sectional view showing a method for coupling a lock body to a cover unit of an electric steering lock device in a vehicle in accordance with the present invention, respectively.
Figure 4B:
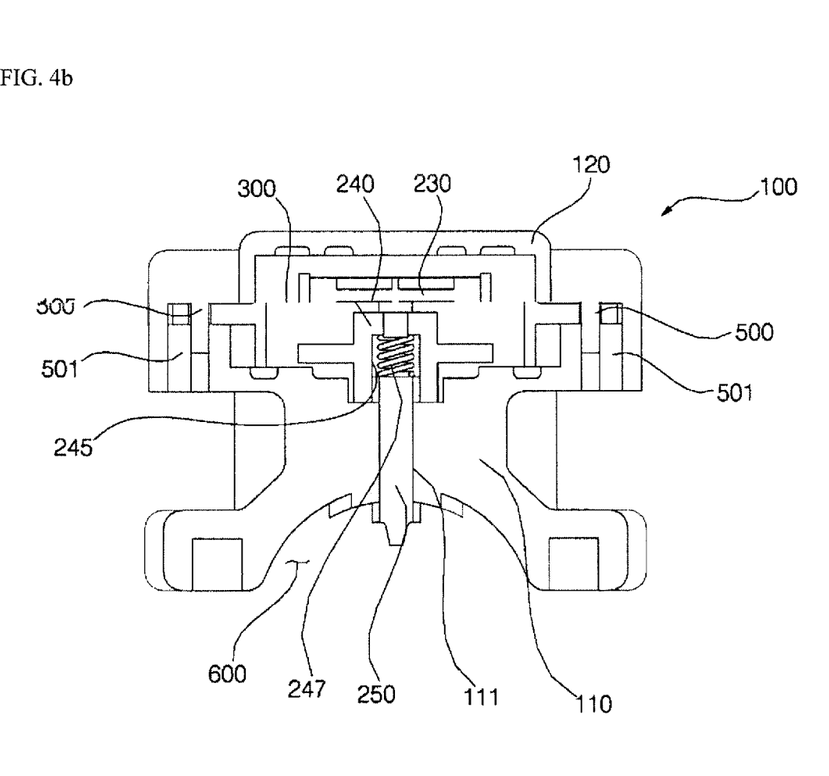
Figure 5A:
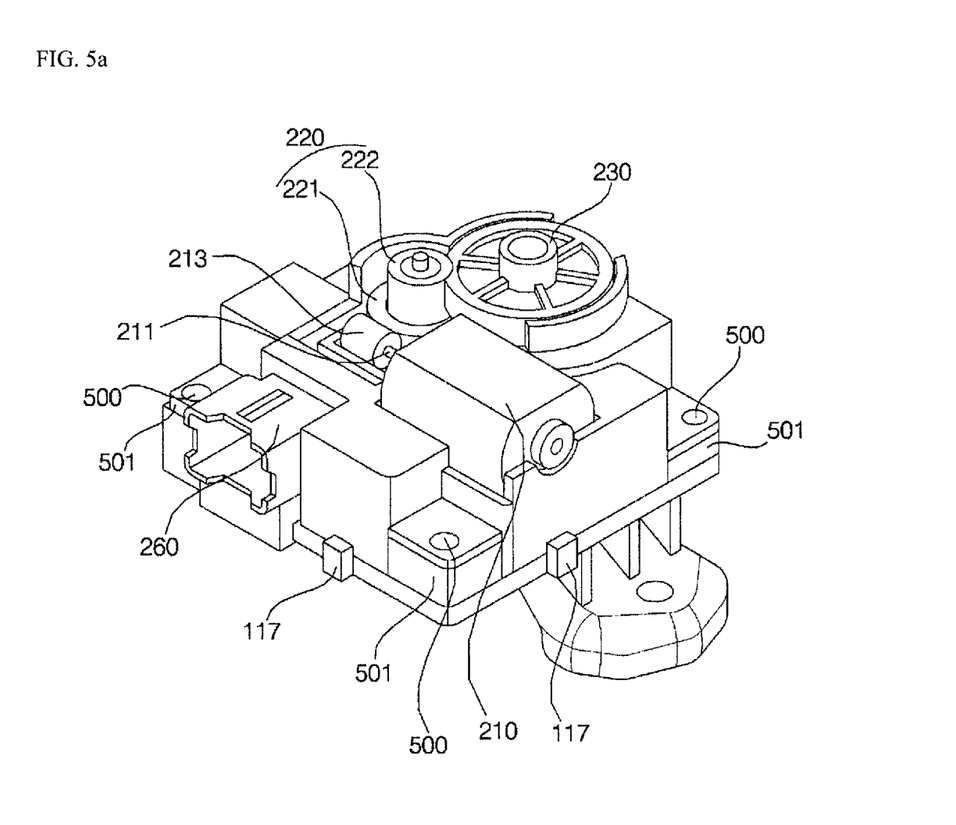
FIGS. 5a and 5b illustrate a perspective view and a sectional view of a second assembly step in an assembly method of an electric steering lock device in a vehicle in accordance with the present invention.
Figure 5B:
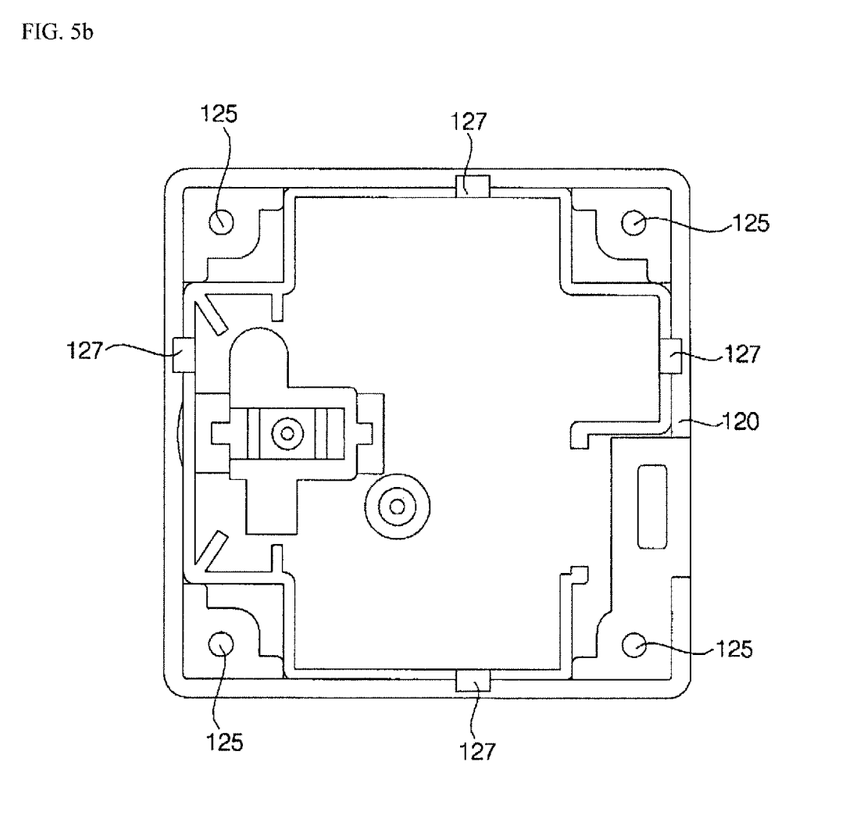

FIGS. 4a and 4b illustrate a plan view and a sectional view showing a method for coupling a lock body 110 to a cover unit 120 of an electric steering lock device 100 in a vehicle in accordance with the present invention respectively, and FIGS. 5a and 5b illustrate a perspective view and a sectional view of a second assembly step in an assembly method of an electric steering lock device in a vehicle in accordance with the present invention.

Referring to FIGS. 4a and 4b, the method for assembling an electric steering lock device 100 in a vehicle in accordance with a preferred embodiment of the present invention includes a first assembly step for mounting a drive motor 210, a worm wheel gear 220, and a spur gear 230 to the plurality of mounting places such that power generated by the drive motor 210 in an inside space which falls under the inside space on the upper side of the partition unit 300 is forwarded to a lower side through the worm gear 213, the worm wheel gear 220, and the spur gear 230, and mounting a lock stopper unit 240 to a moving space such that, in the inside space which falls under the lower side of the partition unit 300, the power forwarded from the upper side is involved in vertical direction movement of the lock stopper unit 240, whereby finishing assembly of the drive unit assembly 200.

And, the method for assembling an electric steering lock device 100 in a vehicle in accordance with a preferred embodiment of the present invention further includes a second assembly step for assembling the drive unit assembly 200 assembled in the first assembly step to the lock body 110 such that the lock bar 250 reciprocates through the lock hole 111 formed downward, and a third assembly step for assembling the cover unit 120 to a top side of the lock body 110 such that the drive unit assembly 200 assembled in the second assembly step is protected from an outside of the electric steering lock device 100.

In detail, the first assembly step is a step in which, after seating on, and mounting the worm wheel gear 220 to the worm wheel gear mounting place 320 formed on the upper side of the partition unit 300, the lock stopper unit 240 is mounted to the moving space formed on the lower side of the partition unit 300, the spur gear 230 is mounted to the spur gear mounting place 330 formed on the upper side of the partition unit 300 by turning the spur gear 230 such that a male thread 243 which is a fore end of the lock stopper unit 240 is inserted in a female thread formed at a rotation center of the spur gear 230 for fastening the spur gear 230 to the lock stopper unit 240, and mounting the drive motor 210 to the motor mounting place 310 formed on the upper side of the partition unit 300 such that the worm gear 213 which is provided to a fore end of the drive motor 210 is engaged with a first worm wheel gear 221 of the worm wheel gear 220.

The first assembly step may further includes the step of coupling the lock bar 250 by using a coupling pin 251 after placing an elastic member 247 in a space 245 between the lock bar 250 and the lock stopper unit 240, before the lock stopper unit 240 is coupled to the spur gear 230.

It is reasonable that the drive motor 210 is mounted to the motor mounting place 310 horizontally such that the worm gear 213 arranged at the fore end of the drive motor 210 rotates centered on a horizontal axis, and the worm wheel gear 220 and the spur gear 230 are mounted to the worm wheel gear mounting place 320 and the spur gear mounting place 330 such that rotation shafts of the worm wheel gear 220 and the spur gear 230 are perpendicular to a rotation shaft of the worm gear 213, and parallel to each other spaced predetermined distance from each other.

Referring to FIGS. 4a and 4b, the third assembly step is a step in which, of at least four screw fastening holes 501 formed passed through the lock body 110, fastening screws 500 are passed through the screw fastening holes 125 in the cover unit 120, and pass through holes 305 in the drive unit assembly 200 at a time starting from an upper side of the lock body 110, to couple the lock body 110, drive unit assembly 200, and the cover unit 120 at a time with one time of screw fastening.

Thus, after assembling the drive unit assembly 300 at first, the lock body 110, the drive unit assembly 200, and the cover unit 120 are assembled at a time by one time of fastening operation of the fastening screws 500, for reducing assembly steps.

Referring to FIGS. 5a and 5b, in the third assembly step, further to the provision of convenience of screw coupling owing to the fastening screws 500, a plurality of positioning projections 117 are provided projected from an underside of the lock body 110, and positioning recesses 127 are formed in an inner side of edges of the cover unit 120 for reducing an assembly time period by enabling assembly at accurate positions when the cover unit 120 is coupled to the lock body 110.

Thus, the method for assembling an electric steering lock device in a vehicle in accordance with a preferred embodiment of the present invention has an advantage of devising simplification of assembly steps by improving the related art assembly system in which the lock body 110 is assembled at a plurality of scattered places by, after assembly of the drive assembly unit 200 which moves the lock bar 250 vertically at first actually in the first assembly step, assembling the drive unit assembly 200 to the lock body 110 in the second assembly step, and finishing assembly of the cover unit 120 which encloses the drive unit assembly 200 which is in a state assembled to the lock body 110 by using the fastening screws 500 in the third assembly step.

Thus, the electric steering lock device in a vehicle and the assembly method thereof in accordance with a preferred embodiment of the present invention have been described with reference to the attached drawings, in detail. However, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. An electric steering lock device in a vehicle comprising:
    a lock body having a lock hole formed opened downward;
    a cover unit coupled to an upper side of the lock body to form an inside space with the lock body; and
    a drive unit assembly arranged in the inside space to include a partition unit arranged to partition the inside space into an upper side and a lower side to have a plurality of mounting places,
    wherein the drive unit assembly generates power in the inside space located above the upper side of the partition unit and forwards the power to the inside space located under the lower side of the partition unit for moving a lock bar in a vertical direction through the lock hole, and
    wherein the drive unit assembly includes:
        a drive motor arranged on the upper side with a rotation shaft arranged horizontally,
        a worm gear coupled to a fore end of the drive motor to rotate centered on the rotation shaft of the drive motor,
        a worm wheel gear arranged on the upper side engaged with the worm gear to rotate centered on a vertical shaft,
        a spur gear arranged on the upper side engaged with the worm wheel gear to rotate centered on a vertical shaft and having a female thread portion opened downward formed therein,
        a lock stopper unit arranged on the lower side engaged with the female thread portion in the spur gear to move up/down, and
        the lock bar coupled to an underside of the lock stopper unit for locking or unlocking a steering column as the lock bar is exposed to an outside of the electric steering lock device in the vehicle as the lock bar moves up/down along the lock hole according to the up/down movement of the lock stopper unit.

2. The device as claimed in claim 1, wherein the plurality of mounting places includes:
    a motor mounting place for mounting the drive motor thereto,
    a worm wheel gear mounting place for mounting the worm wheel gear thereto to engage with the worm gear to rotate centered on a vertical shaft, and
    a spur gear mounting place for mounting the spur gear thereto to rotate centered on a vertical shaft which is parallel to the vertical shaft of the worm wheel gear.

3. The device as claimed in claim 2, wherein a moving space is provided under the spur gear mounting place for up/down movement of the lock stopper unit.

4. The device as claimed in claim 1, wherein the worm wheel gear includes a first engage portion engaged with the worm gear, and a second engage portion engaged with the spur gear, and
    wherein the second engage portion is positioned higher than the first engage portion to match with a height of the top side of the drive motor.

5. The device as claimed in claim 1, wherein the lock stopper unit includes a male thread portion formed therein as one unit therewith at a top side thereof to match with the female thread portion in the spur gear.

* * * * *